США010387891B2

(12) United States Patent
Shoemaker

(10) Patent No.: US 10,387,891 B2
(45) Date of Patent: Aug. 20, 2019

(54) METHOD AND SYSTEM FOR SELECTING AND PRESENTING WEB ADVERTISEMENTS IN A FULL-SCREEN CINEMATIC VIEW

(75) Inventor: Austin Shoemaker, Stanford, CA (US)

(73) Assignee: OATH INC., New York, NY (US)

( * ) Notice: Subject to any disclaimer, the term of this patent is extended or adjusted under 35 U.S.C. 154(b) by 1916 days.

(21) Appl. No.: 11/751,577

(22) Filed: May 21, 2007

(65) Prior Publication Data
US 2008/0091526 A1    Apr. 17, 2008

Related U.S. Application Data

(60) Provisional application No. 60/829,841, filed on Oct. 17, 2006, provisional application No. 60/829,840, filed on Oct. 17, 2006.

(51) Int. Cl.
*G06Q 30/02* (2012.01)
*G06Q 20/10* (2012.01)

(52) U.S. Cl.
CPC .......... *G06Q 30/02* (2013.01); *G06Q 20/10* (2013.01); *G06Q 30/0257* (2013.01); *G06Q 30/0269* (2013.01); *G06Q 30/0273* (2013.01)

(58) Field of Classification Search
CPC .................................................. G06F 3/0481
USPC ...................................................... 705/14.1
See application file for complete search history.

(56) References Cited

U.S. PATENT DOCUMENTS

| | | | | |
|---|---|---|---|---|
| 6,005,579 A | * | 12/1999 | Sugiyama | G06F 3/04815 715/788 |
| 7,383,495 B2 | | 6/2008 | Dontcheva et al. | |
| 7,774,431 B2 | | 8/2010 | Conn et al. | |
| 7,930,384 B1 | * | 4/2011 | Lester | G06Q 30/02 705/14.41 |
| 7,945,852 B1 | * | 5/2011 | Pilskalns | 715/230 |
| 2003/0188309 A1 | * | 10/2003 | Yuen | 725/41 |
| 2004/0059659 A1 | | 3/2004 | Safaei et al. | |
| 2004/0139396 A1 | | 7/2004 | Gelernter et al. | |
| 2004/0205514 A1 | | 10/2004 | Sommerer et al. | |
| 2005/0257400 A1 | | 11/2005 | Sommerer et al. | |
| 2006/0053109 A1 | * | 3/2006 | Sudanagunta | G06Q 30/02 |
| 2006/0093998 A1 | * | 5/2006 | Vertegaal | G06F 3/011 434/236 |
| 2006/0110008 A1 | * | 5/2006 | Vertegaal | G06K 9/00604 382/103 |
| 2006/0156240 A1 | * | 7/2006 | Lemay | G06Q 10/107 715/730 |
| 2006/0242574 A1 | * | 10/2006 | Richardson | G06F 16/957 715/210 |

(Continued)

*Primary Examiner* — John Van Bramer
*Assistant Examiner* — Darnell A Pouncil
(74) *Attorney, Agent, or Firm* — James J. DeCarlo; Greenberg Traurig, LLP

(57) ABSTRACT

In response to user input associated with a previously displayed reduced-size version of an advertisement displayed in connection with a slideshow, a fall-screen view of the advertisement is displayed, for example according to a rule-based or probabilistic system to improve the applicability of the advertisement to the content being viewed. A cost-per-view (CPV) advertising model monetizes user interaction with an advertisement that results in navigating a content viewer to a landing page displayed within the viewer such that context of original content being viewed within the viewer is preserved.

20 Claims, 5 Drawing Sheets

12

(56) References Cited

U.S. PATENT DOCUMENTS

| | | | |
|---|---|---|---|
| 2006/0282328 A1* | 12/2006 | Gerace | G06Q 10/10 |
| | | | 705/14.66 |
| 2007/0022020 A1 | 1/2007 | Bernstein | |
| 2007/0050251 A1* | 3/2007 | Jain | G06Q 30/02 |
| | | | 705/14.52 |
| 2008/0022229 A1 | 1/2008 | Bhumkar et al. | |
| 2008/0091658 A1* | 4/2008 | Kremen | G06F 16/958 |

* cited by examiner

... who have received flowers...
640 x 480 - 203k - jpg
www.darrenbarefoot.com

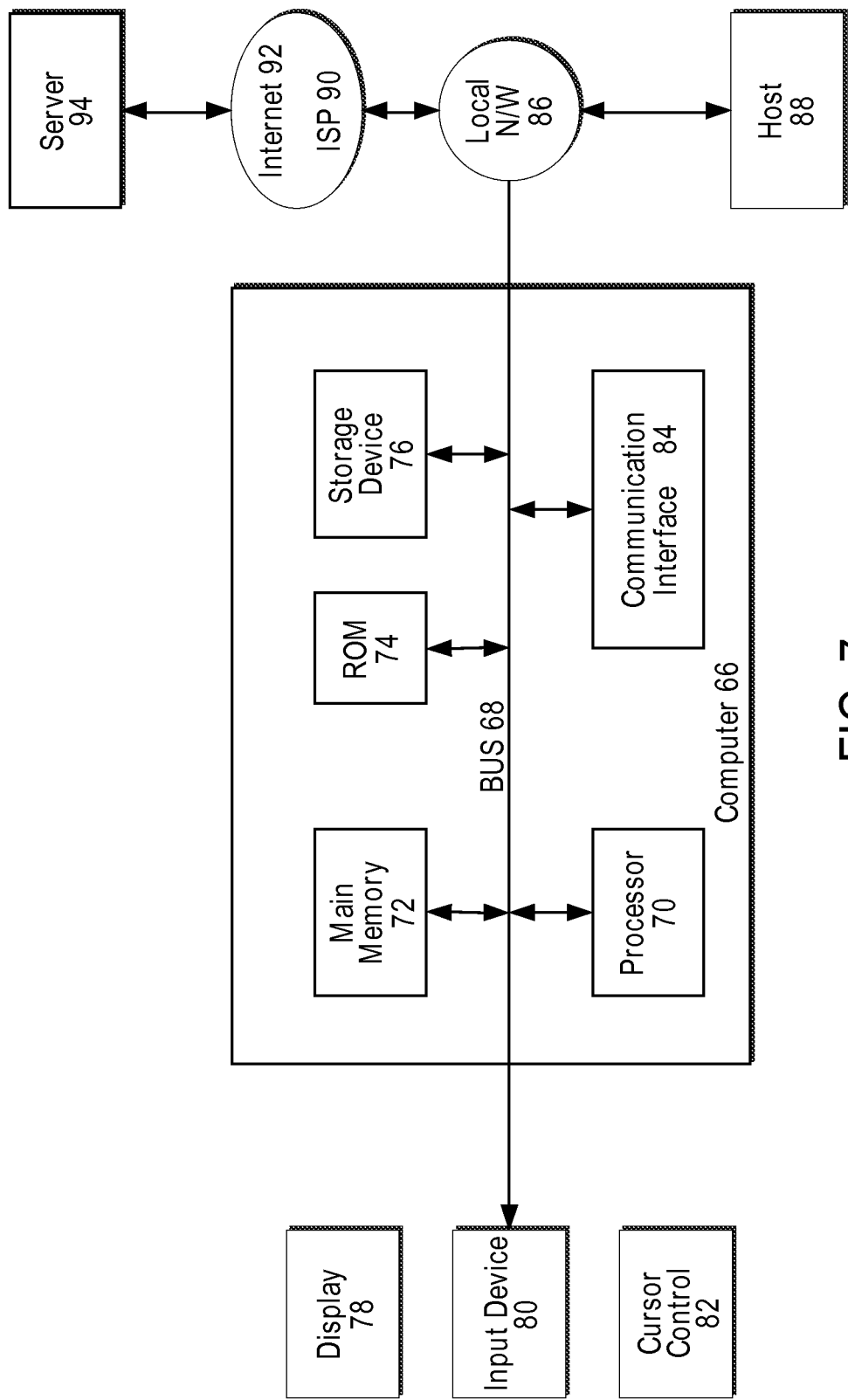

METHOD AND SYSTEM FOR SELECTING AND PRESENTING WEB ADVERTISEMENTS IN A FULL-SCREEN CINEMATIC VIEW

RELATED APPLICATIONS

This application is a nonprovisional of and claims priority to U.S. Provisional Patent Application No. 60/829,841, filed 17 Oct. 2006, which provisional application is incorporated herein by reference, and further incorporates by reference U.S. Provisional Patent application 60/829,840, filed 17 Oct. 2006.

FIELD OF THE INVENTION

The present invention relates to systems and methods useful for extracting and presenting sponsored content or advertisements from a Web site or other content source in a full-screen slideshow experience.

BACKGROUND

Conventional Web-based advertising techniques include sponsored advertisements (ads), banner ads, pop-up windows, and other techniques. For the most part, pop-ups and banner ads are viewed by most Web users as annoyances to be avoided. Sponsored ads are less annoying, but often provide poor return on investment for the advertisers. One reason for this is that the advertisements appear as uninteresting links associated with search result pages. Users have little or no way of knowing whether the ad is truly responsive to the search inquiry and are not compelled by its visual representation to interact with the ad.

SUMMARY OF THE INVENTION

In varying embodiments, the present invention provides for displaying, in response to user input associated with a previously displayed reduced-size version of an advertisement displayed in connection with a slideshow, a full-screen view of the advertisement. The reduced-size version of the advertisement may be selected by one of: a mouse hover, or a mouse click, or other user interaction with a contextual trigger such as a visual region on-screen, a speech recognition, an attentional cue, or a detectable indicator of interest. In some cases, the advertisement adapts its content or behavior in response to information about the user.

The reduced-size version of the advertisement may be selected for display according to a rule-based or probabilistic system to improve the applicability of the advertisement to the content being viewed. Such a rule-based system may accept as an input a set of parameters and apply a decision tree to select the reduced-size version of the advertisement to display. A probabilistic system may apply a statistical model to match advertisement content with presentation opportunities and may take into account the context of content being displayed, browsing and ad-interaction history of the user, and presentation histories of the advertisement.

A further embodiment of the invention introduces a cost-per-view (CPV) advertising model in which user interaction with an advertisement results in navigating a content viewer to a landing page displayed within the viewer such that context of original content being viewed within the viewer is preserved.

These and other features and advantages of the present invention are described more fully below.

BRIEF DESCRIPTION OF THE DRAWINGS

The present invention is illustrated by way of example, and not limitation, in the figures of the accompanying drawings, in which:

FIG. 7 illustrates an example of a computer system on which embodiments of the present invention may be installed and executed.

DETAILED DESCRIPTION

Figure 1:
FIG. 1 is a screenshot showing a user interface for an image search engine.

The present invention relates to methods and systems useful for extraction and presentation of sponsored content or advertisements (ads) from any Web site in a full-screen slideshow via a browser plug-in/add-on, application or any browser feature. The plug-in allows the user to view the on-line ads with a high level of sensory engagement, and also with a high degree of interactivity offered by the ad, and the potential for integration with other systems such as the browser. The plug-in is henceforth referred to as Ad PicLens.

The related U.S. Provisional Patent Application 60/829,840, referenced above described methods and systems which permit user-initiated or intelligently automated acquisition, extraction and presentation of content such as photos, videos, and/or other content (e.g., news stories, product displays, advertisements, etc.), from a Web site in a full-screen slideshow via client-side software, which may be implemented as a stand-alone application, an extension (a.k.a. plug-in, or add-on), a Web browser feature (a.k.a. function), or as an embedded component associated with the content. Such a system is described herein in detail for the convenience of the reader.

In the case where one or more of the methods of the present invention are incorporated as a feature in a Web browser, a user interface enables the user to position a cursor over an image, video or other content on a Web site and initiate the full-screen mode by clicking on an icon that is superimposed or otherwise displayed over or in the vicinity of the content of interest. Other methods of activating the full-screen view are also possible, for example activating same from a preview window such as that described in U.S. Provisional Patent Application No. 60/753,783, filed Dec. 23, 2005, incorporated herein by reference, simply clicking a button in the browser (or performing a similar cursor control action), or initiating it from a display of recommended content. The browser feature which is an embodiment of the present invention is referred to below as PicLens™.

Recently, the use of browser features and widgets has steadily increased. Successful photo sites such as Flickr™, Zooomr™, Bubbleshare™, Rockyou™, etc. have prompted a substantial number of companies to release products in the area of photo viewing and sharing. Unlike these prior products, however, PicLens provides client-side software that leverages the capabilities of modern graphics processing units (GPUs) to provide users with an immersive, cinematic experience when viewing Internet content (such as photos, videos, news, RSS and other rich media), and a significantly enhanced medium through which they can consume and share this content. More specifically, PicLens enables users of a Web browser to view photos, videos and other rich content as a slideshow, grid view, shared surface, or other navigable modality in full-screen mode.

While some current on-line photo sites allow users to view their photos as a slideshow, most do not allow users to do so in a full-screen mode. The present invention solves this problem. Furthermore, the present invention allows users to navigate within such slideshows though straightforward keyboard and/or cursor control operations. The user can select the next video or photo by performing an appropriate keyboard or cursor control operation (e.g., clicking the spacebar or left/right arrow key on the keyboard) or using a remote control. To exit the slideshow, the user can perform another such action (e.g., click the close button and/or press any key other than those assigned to other functions). The present invention also allows users to initiate the full-screen view on any site whereas other applications or widgets are restricted and limited to working on only a few specific sites.

The present invention is particularly relevant to photo-centric, video-centric, and news-centric Web sites, and can also be applied as a rich messaging medium. Further, the present invention can be used to enhance the on-line retail experience by leveraging the powerful navigation and visualization capabilities built into PicLens. Full-screen 2D and/or 3D views of products, fast and intuitive navigation, and user-directed progressive information disclosure are examples of how the invention could be used to enhance the discovery of store inventories. PicLens may allow on-line shoppers to listen to music from the music library on their computer or an Internet host while browsing in full-screen mode. This combination improves the quality of the shopping experience and makes it more personal and therefore memorable.

Refer now to FIG. 1, which is a screenshot 10 of a Web browser running on a personal computer. The browser has retrieved the home page 12 of an image search engine, which is useful for demonstration purposes. However, the present invention may be used with any Web site and is not limited to use with this image search engine or results retrieved thereby.

Figure 2:
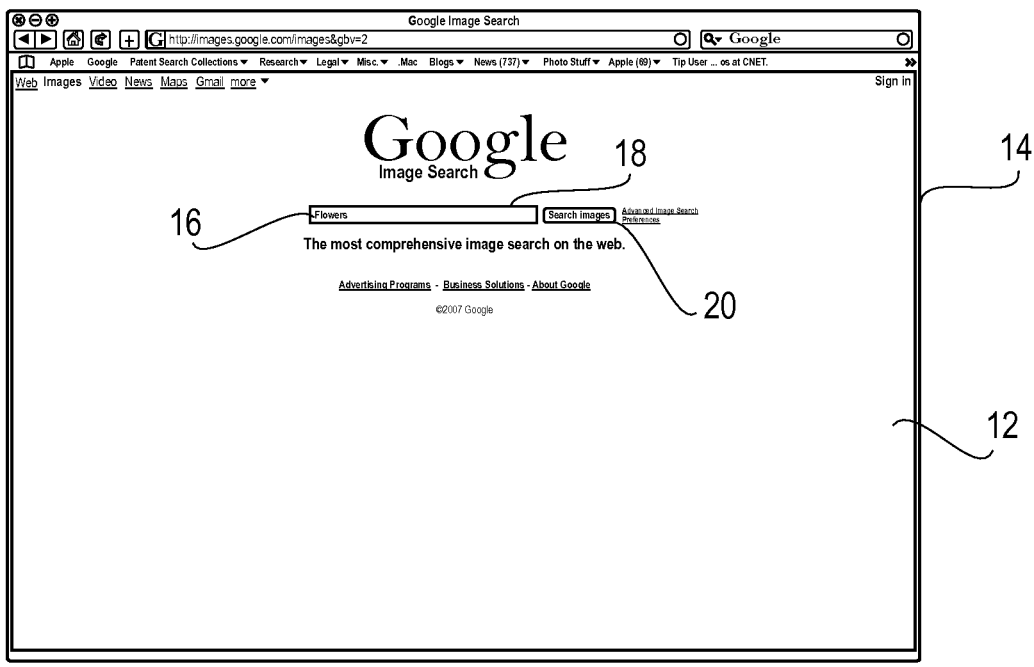
FIG. 2 is a screenshot showing a search term entered in the user interface shown in FIG. 1.

FIG. 2 shows a screenshot 14. A search term 16 has been typed in text box 18. When this search term is passed to the image search engine, for example in response to a cursor control operation such as a mouse click when the cursor is positioned over button 20, the search engine will parse the search term and return images which correspond thereto. The details of such operations are not critical to the present invention and merely represent a convenient way to retrieve images which can be presented in full screen immersive views, in accordance with the present invention.

Figure 3:
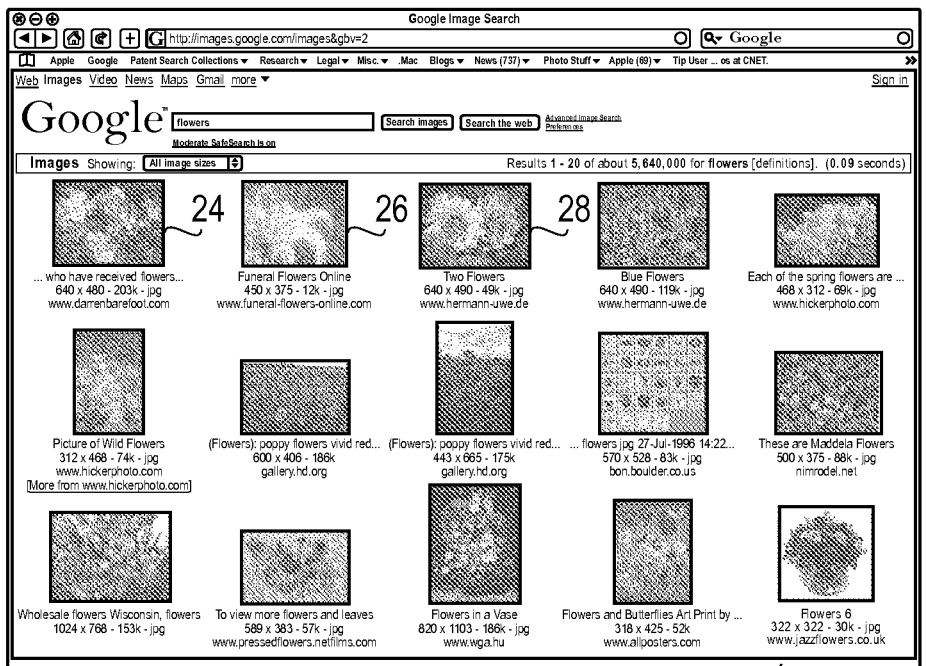
FIG. 3 is a screenshot showing results returned by the search engine in response to the search query being submitted.

FIG. 3 is a screenshot 22, showing the results returned by the search engine. Because this is an image search engine, the results are images that are indicative of the search term. In this case, the images 24, 26, 28, etc. are of flowers because the search term "flowers" was submitted to the search engine. As shown, there are multiple such images returned on a single results page; consequently each individual image is rather small.

Figure 4:
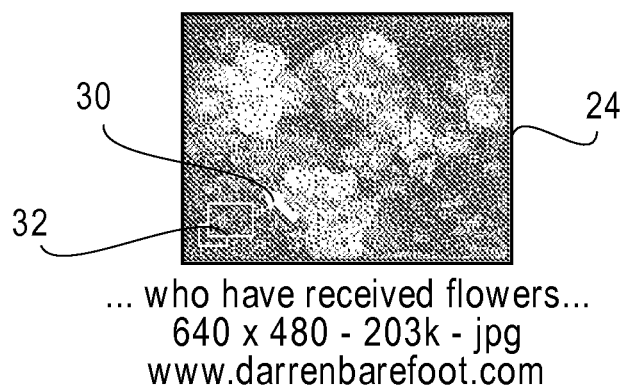
FIG. 4 shows one of the image results returned by the search engine in greater detail and also shows an icon superimposed over the image to indicate the availability of a full screen immersive viewing experience in accordance with embodiments of the present invention.

FIG. 4 is an enlarged view of image 24 that was returned as part of the search results. As with all of the search result, image 24 is taken from a different source that was at some point cataloged or otherwise referenced by the search engine. Metadata or other information associated with the image identified it as pertaining to flowers, hence, when the search term "flowers" was submitted to the search engine, image 24 was deemed to be relevant and so was returned.

Also shown in this enlarged view is cursor 30. This is the cursor of the user's personal computer within the browser window in which the search results page, and, hence, image 24, is displayed. As cursor 30 was positioned close to image 24, icon 32 was also displayed to the user. In this example, icon 32 is made to resemble an expansion of a small image to a full-screen view thereof. Of course, this is only an example and any visual indicator could be used. The purpose of icon 32 is to provide the user with a selectable tool or other indicator by which the user may initiate full-screen immersive views of content in accordance with the present invention. That is, if the user positions cursor 30 over icon 32 and performs a cursor control operation (e.g., such as a mouse click, double click or other operation), the PicLens viewer will be launched, allowing the user to navigate the associated content (in this case the images which were returned in response to the search request) in full-screen mode.

Figure 5A:
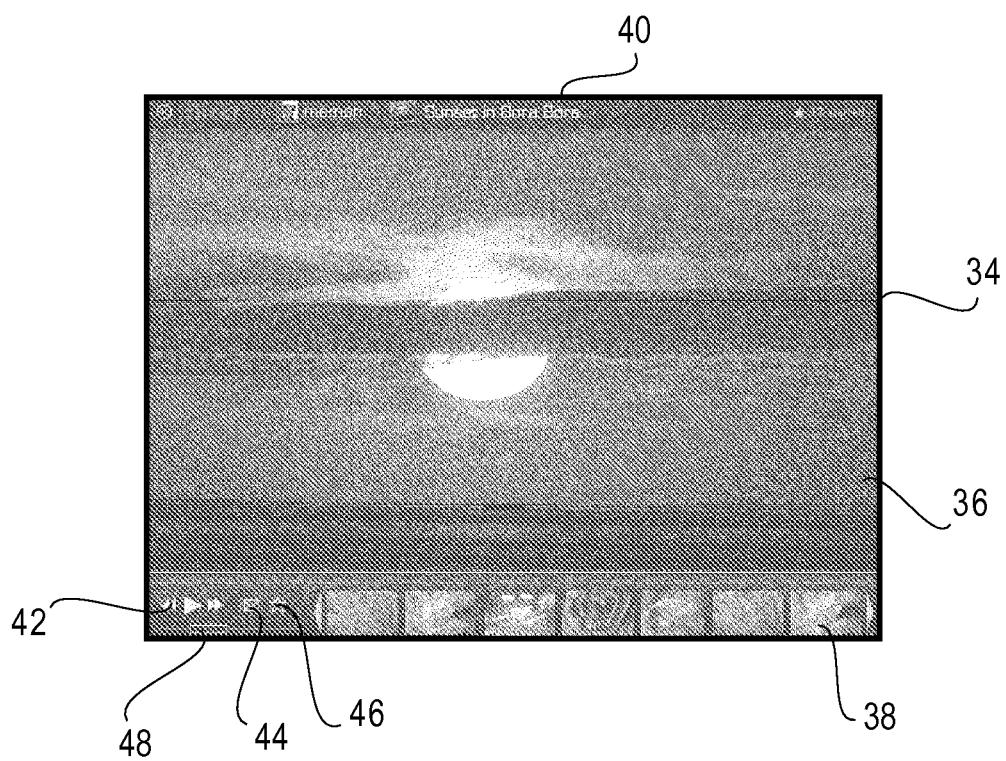
FIG. 5a is a screenshot illustrating an example of a full-screen immersive view of an image along with other image viewing tools in accordance with embodiments of the present invention.

FIG. 5a is a screenshot 34 that illustrates an example of a full-screen slideshow provided by PicLens. In this particular example, the screenshot has been taken as the user utilizes PicLens to view photos on flickr.com. For example, these may be photos from the user's own flicker.com photo album. Notice that a current picture 36 is displayed in a full-screen (or nearly full-screen) view while other pictures in the user's photo album are displayed along an edge of the screen in a thumbnail strip 38. The user may navigate through these photos using keyboard/cursor operations as discussed above. As each individual image is selected, it is displayed in full-screen mode. Other details, such as titles and/or ratings of the content, EXIF, user tags, file path, image name and/or other metadata may be displayed in an information bar 40.

A slideshow of the images in the thumbnail strip may be initiated and controlled using the slideshow controls 42. These typically include options to play/pause, skip and review (i.e., rewind). Additional controls allow a user to send copies of images by email 44 and/or to assign ratings 46 to images as they are viewed. The slideshow controls may be part of the retractable thumbnail strip and allow the user to easily navigate in full-screen or grid-view mode without having to leave PicLens. This allows the user to select any content item out-of-order from whence to initiate the slideshow, thus providing a higher degree of control to the user.

A scroll bar 48 may be located at the bottom of the thumbnail strip, and is an indicator of where the viewed content is relative to the universe of the results. The scroll-distance may be linear or non-linear (to handle large quantities of content) and dragging the scroll bar in either direction enables the user to quickly navigate between disparate regions of the content sequence.

Various indicators associated with the scroll bar may provide at-a-glance information about the location of starred or other highly rated items within the content sequence. Such content of interest may be depicted by colored triangles or markers superimposed over the scroll bar, providing visual clues to the user to navigate to that region of the content. Other attributes of content items may be displayed as scroll bar markers with different appearances. Of course, these features are purely optional and are not critical to the present invention.

In one embodiment, PicLens is implemented as computer software (i.e., computer readable instructions embodied on a computer-readable medium) comprised of a platform independent core and a platform-specific abstraction layer, which allows the core to operate without knowledge of the specific environment within which it is running. The core subsumes functionality such as analyzing Internet content for viewable material, managing the transmission and caching of the content, rendering the full-screen user interface, and responding to input events. In one embodiment, the core uses the OpenGL interface to render content to the screen.

Various embodiments of PicLens are configured to work with Safari™ and Firefox™ browsers on the Mac™ platform (i.e., computer systems running the Mac OS™ available from Apple Computer, Inc. of Cupertino, Calif.), or browsers operating on the Microsoft Windows™ platform (including the Firefox™ and Internet Explorer™ browsers) or browsers operating on the Linux platform. In each instance, PicLens may be configured to pre-fetch images on a current Web page being displayed so as to ensure that a slideshow composed of such images is smooth and the transitions between the images are seamless. The pre-fetching is not necessarily limited to just images or media on the current page or Web site, but can be expanded to fetch images or media from other data sources (e.g., Web pages, XML feeds, server-generated content) as well. In addition to the PicLens normal user mode (i.e., full-screen immersive view), various options may be offered to users. Examples include a screensaver mode, which may be triggered when the user's computer has been inactive for a period of time, and a synchronized play on multiple displays/kiosk mode, for a user wanting to view content on multiple monitors.

PicLens includes multiple functions to enhance the overall user experience. JavaScript code may be used to display an icon (such as icon 32 described above) on any photo or media element on a Web page or other Web site element to indicate that the content is PicLens-enabled (i.e., capable of being viewed in the PicLens full-screen environment). Further, PicLens may be enabled for immersive viewing of diverse content types such as news, Web pages, photos or other images, videos, RSS feeds, or combinations of these or any other media types.

As indicated above, PicLens may display (e.g., via the information bar described above) the original location (e.g., URL, human-readable path, etc.) from which the content has been extracted. This information may represent attribution to the original content provider. The display of this information may be split up into various components, each of which may be selectable to allow the user to navigate to that level of hierarchy. For example, for the location "Flickr>Mamen>Monsoon", selecting "Flickr" take the user to Flickr's home page (e.g., via a Web browser), selecting "Mamen" would take the user to Mamen's page on Flickr.com, and selecting "Monsoon" would take the user to the specific page that has tagged the photo with the "monsoon" keyword.

PicLens may also be configured to allow users to view other content items in the collection being explored, for example at the bottom or side of the slideshow or in any other layout, such as a two or multi-dimensional grid. Users can navigate to other images/videos by selecting the associated thumbnails instead of proceeding sequentially through the images. Alternatively, these thumbnails can also be used to show high-resolution advertisements as either images, text, videos, or a combination thereof. The thumbnails may be draggable and manageable to organize the order of the content in the slideshow. Elegant switching between various views may be accomplished using three-dimensional effects or transitions to enhance visual impact.

One or more portions of the thumbnail strip 38 (e.g., on the right-most portion of the display) may be reserved for the display of advertisements by linking PicLens to an in-house or an external advertising network. Selecting (e.g., by mouse click) this specific thumbnail or the sponsored content may triggers the display of the ad or sponsored content, which may partially or completely occupy the display. Such a scheme was described in the above-cited U.S. Provisional Patent Application 60/829,841.

Immersive advertising experiences rendered in accordance with embodiments of the present invention, once triggered, expand to take control of a significant region of a user's computer display interface, in some cases a full-screen or nearly full-screen of the display interface, and can offer a rich media experience which may allow the user to interact with the ad, and/or to form a relationship with the advertiser or affiliated parties within the context of the ad. Immersive ads may be activated by a contextual trigger, which may take the form of a visual region on-screen (e.g., text link, image, video, etc.), a speech recognition cue (e.g., "tell me more" or "order pizza"), an attentional cue (e.g., gaze or mouse tracking), or another detectable indicator of interest. In one embodiment, the trigger could be a smaller visual representation of the ad (such as that described above appearing in the thumbnail strip), or content relating to the ad (which may be a logo, slogan, etc.). When the trigger action is performed, the ad expands to a larger area of the display interface. This action could be a mouse hover or click, for example, though any cursor control action would suffice. In some cases, the ad may adapt its content or behavior in response to explicitly or implicitly collected information about the user. Available data about the user may be restricted to an appropriate subset thereof for access by the advertiser.

Once within the immersive experience, the user may execute transactions, financial or otherwise, with the advertiser or parties affiliated with the advertiser. Further, these transactions can be simplified using the information described herein, as some or all data needed to complete the transaction may already be available in the user's profile.

The present invention provides the ability to save/store, bookmark, send or otherwise reference the advertisement, elements of the advertisement, or material referenced by the advertisement. For example, a pizza delivery advertisement delivered as part of a PicLens slideshow could enable the user to save a link to the ordering interface, allowing the ad to establish a business relationship between the customer and the advertiser.

The immersive advertising model of the present invention provides an advertisement capable of delivering coupons, tokens, or other data to the user or the user's profile, which can in turn be applied by the user in future transactions, either explicitly or implicitly. This enables advertisers to adapt future advertisements given a customer's past interaction with the advertiser, either in the context of an immersive ad or otherwise. For example, an advertisement could adapt to show the customer's most frequently purchased kind of pizza.

In accordance with embodiments of the present invention, the ad may be integrated with the context of its trigger. For example, an immersive ad triggered from within a browser window could allow the user to bookmark links to content from within the ad. As another example, an advertisement both produced and delivered by a web site could allow the user to add items to the site's shopping cart without leaving the immersive environment.

When selecting an ad for display, the PicLens system may apply an automated selection algorithm, such as a rule-based or probabilistic system to improve the applicability of the ad to the content being viewed and the user. A rule-based system accepts as input a set of parameters and applies a decision tree to select the ad to display. One example of a rule-based system is keyword matching, wherein the advertiser inputs a list of relevant search keywords for which their ad is appropriate to display. Conversely, the advertiser may specify an exclusion list of search keywords, content categories, or other attributes for which to avoid presenting their ad. A probabilistic system applies a statistical model to the challenge of matching advertisement content with presentation opportunities. For example, the system could take into account the context of the content being displayed, the browsing and ad-interaction history of the user, and the presentation history of the ad itself in order to select the ad with the highest expected returns for both the advertiser and the user.

A probabilistic system may be used alternatively or additionally to a rule-based system. For example, a feedback-based model may learn from experience which ads to display to whom and in what context; however advertisers may still specify exclusion lists that constrain the decision-making process of the probabilistic system. Examples of probabilistic frameworks that may be used in this capacity include: Bayesian networks, support vector machines (SVMs), Markov decision process (MDP) policy learning, probabilistic plan optimization, and reinforcement learning. Special cases of Bayesian networks include Markov random fields (MRFs), conditional random fields (CRFs), logistic regression, hidden Markov models (HMMs), dynamic Bayesian networks (DBNs), and neural networks. Some models, such as HMMs and DBNs, explicitly take into account the progression of states over time, and are especially well suited to the task of selecting an optimal sequence of ads to present.

Traditional targeted advertising systems attempt to select the best ad to display at any given time. However, this decision is made independently of recent ad views and does not consider future ad views during the selection process. Ad PicLens introduces a unique advertisement selection process that optimizes both the relevance of a single ad display and a sequence of advertisements. The fundamental advantage of this approach is that it allows ads to be presented in a way that cumulatively increases the probability of user interaction with the advertising entity by taking into account the impact of past and future ad views on the user's thought process, priming effects, and decision-making tendencies. The sequence of ads displayed may include multiple ads from the same advertiser, in essence presenting an individualized ad campaign within a short timeframe designed to maximize the impact of the marketing message. While most ads in the sequence may appear unrelated, the order of presentation is designed to achieve higher conversion rates than would be possible if the sequence were not jointly optimized. The planned sequence may be updated given new information about the context or the user, particularly in the information-rich case where a user chooses to interact with a specific ad.

Current advertising models use one of a myriad of compensation paradigms. The most well-known and widely used are cost-per-click (CPC; e.g., as used with Google™ and Yahoo™ sponsored links) and cost-per-impression (CPM; e.g., as used in connection with banner ads and interstitials). A relatively recent paradigm is cost-per-action (CPA), wherein the advertiser pays only when the user completes a transaction, such as a purchase or engagement of services. The present invention introduces a new paradigm called cost-per-view (CPV), which is similar to a CPC, in which the advertiser is charged for a user-initiated action, which takes the user to the ad landing page, with the distinction that the landing page is displayed such that the context of the original content being browsed is preserved.

Ad PicLens further extends the concept of CPV to an incremental compensation model, wherein the ad is billed incrementally as the user progressively engages the advertisement. For example, a small thumbnail ad may be displayed in the corner of the PicLens user interface, which is sufficient to trigger a CPM fee. Should the user elect to click on the ad, and it expands to full screen, a CPV may be collected commensurate with the added value of the full-screen exposure. Furthermore, should the user choose to interact with the ad in some way, a CPA may be collected corresponding to the higher probability of follow-through indicated by the user's high level of interest in exploring the marketed product or service.

Figure 5B:
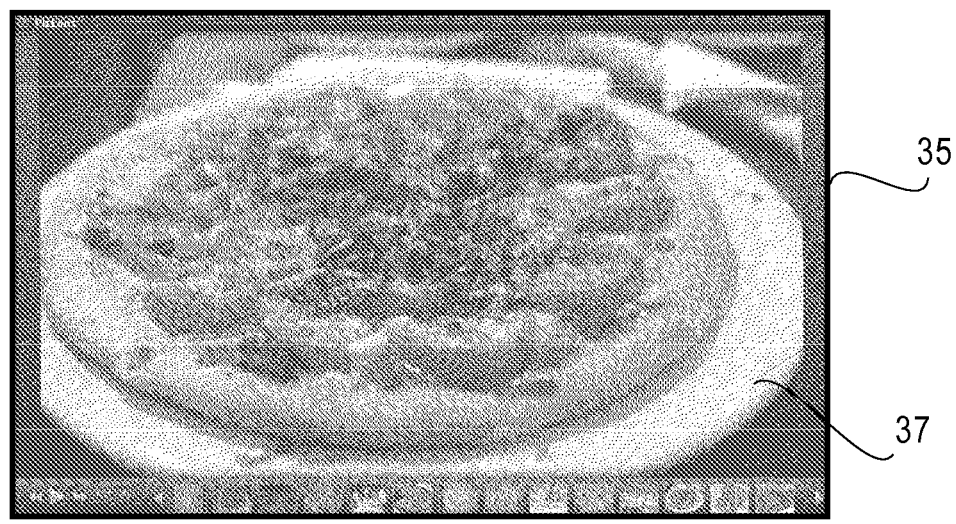
FIG. 5b is a screenshot illustrating an example of a full-screen immersive view of an advertisement, in accordance with an embodiment of the present invention.

FIG. 5b illustrates an example of Ad PicLens in full-screen mode. The screenshot 35 has been taken as the user utilizes Ad PicLens to view an advertisement 37. The advertisement may be launched from the thumbnail strip as discussed above and expands to a full-screen view to provide an immersive, inviting environment for the user.

PicLens may also be configured to include a toolbar (not shown in detail) that can display user-selected photos from a variety of Web sites such as Facebook™, Flickr™, Zooomr™, etc. During the slideshow the user can access a slideshow toolbar (e.g., by performing a cursor control operation to reveal the toolbar) to gain access to some or all of these functions. In some cases the toolbar will automatically hide if no user activity is detected for a predetermined period of time. The toolbar may contain a set of images organized as a list, stack, multi-page view, or other appropriate layout. Furthermore, the contents of the toolbar may change dynamically as a function of user actions or attention. Further, PicLens can be configured to read XML feeds (e.g., RSS, Atom, GData) provided by these sites, and use metadata included in such feeds to improve the process of selecting content to view in PicLens.

The attributes of content items viewed within PicLens implicitly place those items into a set with other items that share a given attribute value. For example, all photos taken on a certain date belong to a set for that day, and all photos tagged with a certain keyword belong to a set for that keyword. The present invention allows a user to navigate from a content item (or items) to a set of images sharing a given attribute (or attributes). In addition, the content item usually has an explicit location within a graph structure, most often defined by a content provider for the content under consideration. For example, a photo may belong to an album, which in turn may be part of a particular user's published collection. Finally, a content item may be deemed related to a set of other items, or other items may be recommended through some criteria. These attributes, as with intrinsic attributes of the content, form additional edges in the content graph. The present invention provides for displaying such navigation information in the form of a path, which shows the ancestors (defined by graph parents) of a currently viewed item, or as any embodiment of graph neighborhood visualization, e.g., a node-edge diagram or three-dimensional spatial representation.

PicLens may allow for a timeline-view for Web-based content. This may be an extension of a user's "Favorites" wherein PicLens may timestamp user interaction with content and thereby produce a timeline of viewed content presented to the user in an intuitive format. The invention may assign variable weighting to content with different access patterns, e.g. access count, access duration, level of interaction with content, inferred interest, and other attributes may alter the presentation of the content within a view aligned with the designated access pattern.

The PicLens full-screen viewer may be configured to include a text box or other input device for use as a search engine interface. The search may be limited to the content already imported into PicLens or may be directed to any locally stored or Web-based content. The search may be associated with recent full-screen slideshows and/or grid views and may allow users to search content by issuing a query, with results ranked, for example, by contextual similarity to the items currently or recently viewed. Alternatively or in addition, other ranking algorithms or probabilistic models may be used to produce the result set. The software may allow the user to vary the context sensitivity of the search; specifically, the result set may be biased toward recent browsing activity or other contextual information, it may ignore contextual factors, or it may interpolate between the two extremes of context-sensitivity. The user also may have the ability to select content sources with or without regard for contextual similarity. Alternatively, the user could also search through other sites and view the results within the full-screen mode.

The user need not necessarily exit PicLens or switch back to browser mode to view or search for new content as PicLens may be configured to pre-fetch or automatically fetch content from subsequent (and, if applicable, preceding) search result pages. This may lead to an extended full-screen viewing session, beyond that which would be possible using mere search result pages.

The user may also be provided with semantic search results that may be related to the original query. In order to provide a visual representation of the semantic or related searches, a tag cloud may be used. This tag cloud may provide an easy way for the user to refine a search query and dynamically see the results appear in PicLens. In one embodiment, a tag cloud may be integrated into the full-screen mode as a split-screen visual representation used to augment the display of search results and to facilitate query refinement.

A collaborative filtering mechanism may also be implemented wherein the user is permitted to view results ranked by inference about his/her preferences based on learning from explicit feedback (e.g., ranking, starring, etc.) or implicit feedback (e.g., time spent, level of interaction, etc.) from other users.

The present invention may be used to view text content, such as news, documents, etc., in an immersive mode. PicLens maintains a "current position" within the text, that the user is assumed to be reading. The user can easily indicate a change of focus using a cursor command, or through some other actuator. PicLens can automatically reformat (e.g., scroll, resize, etc.) the presentation to optimize the viewing of the current position. Furthermore, auxiliary content deemed relevant to the current focus may be shown alongside the text content. Examples of relevant auxiliary content include photos related to a news article, a map of a referenced location, profile information about an individual mentioned, etc. The user may navigate to related content or content linked from within the article or work being viewed, with the option of returning to the original context as in a traditional Web browser.

As indicated above, PicLens allows users to rate full-screen content using a rating control 46. The rating control may be included as part of the slideshow toolbar or may be included in a separate toolbar (e.g., displayable on the side of the screen). By rating (e.g., by assigning stars or other rating indicia) items or collections of items in the full-screen view or in a grid-view the user can accomplish multiple tasks, for example:

i. The "starred views" may be saved as hyperlinks to enable the user to visit the associated content item again easily.
ii. The starred views may be published to external sites, such as bookmarking sites, printing sites, social networking sites, etc.
iii. The starred views may be exported as part of a slideshow when/if the user decides to share a slideshow with someone else.
iv. A starred album/set may be saved for later viewing. In a bidirectional way, PicLens may allow the user to publish, print or upload the rich content, e.g., photos and videos, directly from the user's computer to a website using the website's APIs.
v. Starring may also be extended to photos or content that reside on the user's computer or personal storage. This can permit the user to watch the photos in a full-screen mode and use full capabilities of PicLens without invoking the browser.

PicLens may be configured to allow users to share images/videos with others using a share function along with a compressed representation (e.g., thumbnail or video clip) of the content item and optionally a personalized note. When the user initiates the share function (e.g., through the use of control button 44), the user may send anyone a link to the content, along with its thumbnail and a personalized note. The share function allows the content to be addressed to an individual or a group of individuals, and may deliver the content directly via e-mail, or by reference through a URL reference, store-and-forward, or peer-to-peer system.

The current invention is not limited to viewing slide shows on the Web. The slideshows generated using PicLens may be sent to mobile phones or PDAs using SMS, MMS, Bluetooth or other communications protocols. From within PicLens the slideshows may be sent to a television or to another computing device, such as a game console (e.g. Wii, Apple® TV). This may allow the user to watch slideshows using their respective remote controls to navigate within content sets.

PicLens can enable a rich messaging medium that allows users to participate in collaborative white-boarding, or to send messages (asynchronously or in real-time) in full-screen, or to send photos with messages in full-screen mode. PicLens may also permit a user to choose a photo and create a postcard, by giving the user the ability to attach a note to the photo (e.g., either directly on top of the photo or "behind" the photo by allowing the user to rotate the image on the screen to show a virtual reverse side thereof). In such a case, a postage icon superimposed on the virtual postcard may in fact be an advertisement or a logo. A music file may also be attached to this postcard.

Music can be, for some users, an important component of a slideshow. As mentioned above, PicLens supports the playback of music during a slideshow by playing music files from a local library of a local player on the user's computer or such files streamed over the Internet from an Internet server.

Figure 6:
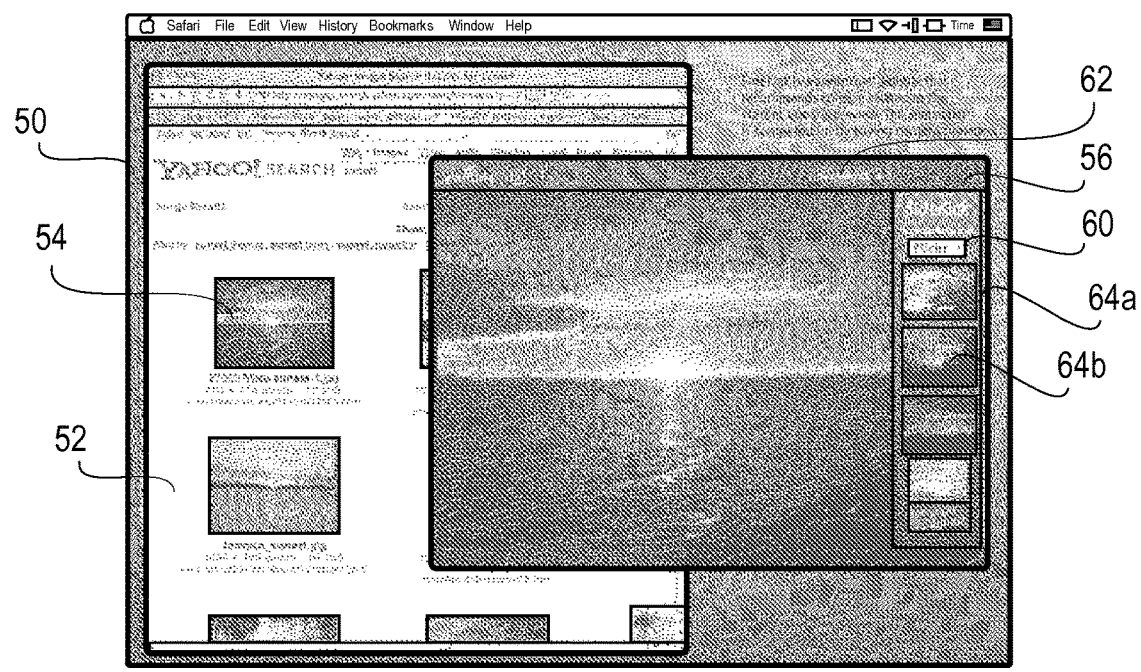
FIG. 6 illustrates an optional SideKick feature configured in accordance with embodiments of the present invention.

Referring now to FIG. 6, a screenshot 50 shows a first window 52 in which a browser is running. The browser has returned images in response to a search query. Image 54 is of a sunset.

Also shown in the screenshot 50 is a PicLens viewer 56 in which image 54 is now displayed in an immersive view 58 (expandable to full-screen size). Included in the PicLens viewer 56 is SideKick 60. The SideKick is an alternate content seeker and provider that is integrated in PicLens. It may also function as a recommendation engine.

To initiate SideKick, the user can select a Sidekick button (which would appear in place of the Hide SideKick button 62, for example, when SideKick is not displayed) or move the mouse to a designated portion of the screen. SideKick may appear as a drawer, for example opening from the side of the screen.

SideKick may display alternate search results (e.g., thumbnails 64a, 64b, etc.) or recommended content based on the content of the slideshow. For example, SideKick can analyze the content currently being displayed in the slideshow, then execute a search for similar content. The similarity may be determined based on metadata or tags associated with the present content being viewed or on other criteria (e.g., user-specified criteria). SideKick may suggest images/videos/rich content from the site that is being viewed or other sites (i.e., different from the one that the content for current slideshow is being taken from) and the content may be relevant to what the user is currently viewing, though not necessarily. In some cases, SideKick can be used to introduce ads and/or sponsored links (these advertisements may be text, images, video, interactive content or a combination of all/any the above and, upon selection, may be viewed in a full-screen mode as well).

PicLens also accommodates the use of stacks. The user can select images or media content in a normal browsing mode and add it to a stack. Adding content in normal browser mode to the stack accumulates it, pre-fetches it and stacks it so the user can initiate the full-screen slideshow mode to view the selected stacked content. PicLens may automatically name and classify the content and provide the user the ability to save the stack.

PicLens may permit a user community to create mash-ups and RSS aggregations in an unprecedented way. The sheer volume of information on the Internet makes it unlikely that any given content will find its way to the users most interested in experiencing it. The present invention proposes a solution to this problem by integrating continuous human feedback into a content routing network combining probabilistic systems modeling individual and aggregate preferences and response characteristics with traditional, deterministic routing mechanisms such as filters, merges, joins, and sorts. This approach to content routing leverages the power of individual users to select preferred content, thusly allowing that content to move up in the value chain for consumption by the rest of the user-base, potentially beginning with other users deemed most likely to appreciate the content given historical interest.

The influence of the opinion of an individual or group in determining the propagation of content through the routing network may be implicitly determined by the individual or group's success in predicting the relevance of specific subcategories of content to specific subpopulations of users. A key advantage of the present invention is the ability to combine human feedback at a local level to make routing decisions in the aggregate that would not be possible for humans to perform due to the sheer volume of information, or for machine to perform due to the lack of insight into human culture and the preferences of multitudinous subpopulations of users.

PicLens may be configured to include a contact list and may also allow for the importing of or use of a contact list from various online address books. It can maintain similar group structures as the ones imported from the metadata or allow a user to create different address groups and subgroups within PicLens itself. The ability to create groups and subgroups allows the user to collaborate with his/her personal network (in private mode) and allows for merging of photo or content streams from that network.

With this ability, PicLens users who are simultaneously present on the collaboration list can simply drop their pictures on a Shared Stack/Front Porch/Table that is attended by their co-collaborators and the collaboration function enables them to either broadcast or merge collective media streams in a chronological or random order and watch the slideshows in a group setting. This may allow for social or communal viewing of content with remotes and may allow users to mix videos with photos to create mash-ups which may be time-stamped.

PicLens provides users the ability to annotate or tag or comment a photo (or rich content) in a full-screen or a grid-view mode. This allows the user to mark a particular photo for future reference or send the comments over to his personal network. The user may also add special tags such as captions, comments, cross-groupings, locations (e.g., using geo-coded information), and themes. The ability to view the geo-tags or search by a particular geography or geo-tag is available as well. During the uploading of photos using a PicLens uploader, the data can be automatically uploaded based on the registration information of the user. The user can also assign keywords or tags using the PicLens tool that becomes specific to image search. This gives the user the ability to submit media RSS feeds that could allow webmasters to have more control over defining what the image is related to.

Additional features enabled by the present invention include the following:
  I. Customizing PicLens with Skins: PicLens may fiction as an independent substitute to the browser. PicLens may be personalized by giving the user the choice to add skins or other external appearances as desired.
  II. Payments in Full Screen for Photo Sales Sites, Ordering Prints from Third Party Providers: While providing the immersive view of content such as photos or stock photos, PicLens may be configured to permit the purchase or license of the content (especially the content being viewed) directly from within the full-screen mode. The ability to print on a local or network printer or the ability to send the content for professional printing on photographic paper or diverse substrates like T-shirts, mugs, etc., may also be provided.
  III. Playing Games with Photos in PicLens: PicLens may be configured to allow a user to generate a photo collage or an online game that blends the ability of immersive viewing with entertainment. The game may be played by an individual user or played across a computer network (e.g. the Internet) between users who may or may not belong to the same group or social network. The key aspect of using content from the Web, such as photos or other rich media, to generate games would constitute a unique proposition.

IV. Substitute to Embedding as a way to Eliminate Widgets—Instead of creating widgets (which are compilations of content that are stored on a server by the widget provider and then displayed on the popular social networking sites), PicLens provides a unique way to accumulate various content data locations and create a compilation of URLs that may then be displayed as a slideshow. Importantly, by using PicLens the user can be retained on the site (social networking site or otherwise) when watching the slideshow as opposed to being redirected to the widget-maker's site.

PicLens may be configured to allow slideshows to be sent to users who may or may not have installed PicLens software on their own computer systems. For this group of users, who may typically be recipients of slideshows, PicLens can exploit the capabilities of a local content player (such as Flash™, etc.) to display the slideshows. Further, in the case of users who wish to embed PicLens slideshows in their profile pages on social networking sites, the interactivity may be specified by publisher/user. As a way to solve the storage issue of storage costs associated with large size of media files, PicLens may use the P2P method (private or fully distributed) of distributed storage instead of the traditional hosting models.

PicLens also provides for star field query refinement. Presently, a user may execute a query using a search engine, returning a static set of results, which may be browsed sequentially to discover items of interest. While this approach is useful, it is limited by the expressive power of the query language and the ability of the search engine to understand the context of the user's information need. Furthermore, the user cannot over-specify the search query, lest the results returned be too narrow to be useful.

The present invention addresses this problem by providing a user interface and probabilistic model that facilitate iterative query refinement in a novel way. Beginning with a set of media items (e.g., query results, fixed list, or random sample), the user is presented with a continuously generated sequence of media items modulated in real-time via user feedback in response to previously presented items. The user identifies photos of interest, alternatively or additionally identifying photos not of the desired class, and this feedback is applied to update a model of the users' information need as the interaction proceeds. As the model converges, the relevance of the presented media items improves.

As an extension of this system, multiple users may participate in a query refinement session, each contributing positive and/or negative feedback to the model, and accelerating the rate of convergence. Individual users may be presented with an identical sequence of items, wherein each participant's selections might be highlighted, for example, by the user's assigned color. Alternatively, participants may receive different streams of media items for which they are expected to provide feedback, though they contribute to and receive from the same probabilistic model.

This probabilistic model may use one or more learning and/or inference algorithms to improve its representation of both its users' immediate information needs and the joint probability distribution over "interesting" media items in general, which will augment its recommendation capabilities in future sessions. Examples of such algorithms include Bayesian networks, hard and soft clustering techniques, support vector machines (SVMs), collaborative filtering, random field inference and structured learning (MRF/CRF), and other probabilistic approaches to modeling a joint distribution.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, readonly memories (ROMs), random access memories (RAMs), EPROMs, EEPROMs, magnetic or optical cards, or any type of media suitable for storing electronic instructions, and each coupled to a computer system bus.

In view of the above, it should be appreciated that some portions of the detailed description presented above are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, readonly memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

FIG. 7 is a block diagram illustrating an exemplary computer system 66 upon which an embodiment of the invention may be implemented. Computer system 66 includes a bus 68 or other communication mechanism for communicating information, and a processor 70 coupled with the bus 68 for processing information. Computer system 66 also includes a main memory 72, such as a random access memory (RAM) or other dynamic storage device, coupled to the bus for storing information and instructions to be executed by processor 70. Main memory 72 also may be used for storing temporary variables or other intermediate information during execution of instructions to be executed by processor 70. Execution of the sequences of instructions contained in the main memory causes the processor to perform the process steps described herein. In alternative embodiments, hard-wired circuitry may be used in place of or in combination with computer software instructions to implement the invention. Thus, embodiments of the invention are not limited to any specific combination of hardware circuitry and software.

Computer system 66 further includes a read only memory (ROM) 74 or other static storage device coupled to the bus for storing static information and instructions for the processor. A storage device 76, such as a magnetic disk, optical disk, floppy disk, flexible disk, hard disk, magnetic tape, or any other magnetic medium, CD-ROM, DVD-ROM, or other physical medium from which computer instructions can read, is provided and coupled to the bus for storing information and instructions.

Computer system 66 may be coupled via the bus 68 to a display 78, such as a cathode ray tube (CRT) or a flat panel display, for displaying information to a computer user. An input device 80, including alphanumeric and other keys, is coupled to the bus for communicating information and command selections to the processor. Another type of user input device is cursor control device 82, such as a mouse, a trackball, or cursor direction keys for communicating direction information and command selections to processor 70 and for controlling cursor movement on the display. This input device typically has two degrees of freedom in two axes, a first axis (e.g., x) and a second axis (e.g., y) allowing the device to specify positions in a plane.

Computer system 66 also includes a communication interface 84 coupled to the bus 68. Communication interface 84 provides a two-way data communication as is known. For example, communication interface 84 may be an integrated services digital network (ISDN) card or a modem to provide a data communication connection to a corresponding type of telephone line. As another example, communication interface 84 may be a local area network (LAN) card to provide a data communication connection to a compatible LAN. In one embodiment communication interface 84 is a wireless communication interface. In any implementation, communication interface 84 sends and receives electrical, electromagnetic or optical signals which carry digital data streams representing various types of information. For example, two or more computer systems 66 may be networked together in a conventional manner with each using a respective communication interface 84.

Communication interface 84 typically provides data communication through one or more networks to other data devices. For example, communication interface 84 may provide a connection through local network 86 to a host computer 88 or to data equipment operated by an Internet Service Provider (ISP) 90. ISP 90 in turn provides data communication services through the world wide packet data communication services through the Internet 92.

Computer system 66 can send messages and receive data, including program code, through the network(s) and communication interfaces described above. In the Internet example, a server 94 might transmit a requested code for an application program, images or other data through Internet 92, ISP 90, local network 86 and communication interface 84. In accordance with the invention, one such downloaded application provides for information discovery and visualization as described herein. The received code may be executed by processor 70 as it is received, and/or stored in storage device 76, or other non-volatile storage for later execution.

Thus, systems and methods useful for presenting Web-based content in full-screen immersive and grid-like views on a personal computer or similar device, so as to provide users with enhanced content browsing/consuming experiences have been described. Although discussed with reference to particular illustrated embodiments, however, the present invention should not be limited thereby. Instead, the invention should be measured only in terms of the claims, which follow.

What is claimed is:

1. A method comprising:
identifying, by a computer system, a plurality of images within a web page displayed on a display screen of the computer system, the identifying being performed in response to receiving the web page at the computer system;
prefetching, by the computer system, the plurality of images from a remote server;
generating, by the computer system, a slideshow user interface that includes one image in the plurality of images in a larger size and a set of images in the plurality of images in a smaller size, wherein responsive to receiving, from a user, user input associated with an image of the set of images in the smaller size, causing the image to be displayed in the larger size, the set of images in the smaller size displayed along an edge of a window in a thumbnail strip, and wherein a first portion of the thumbnail strip displays a reduced-size version of an advertisement and a second portion of the thumbnail strip displays a reduced-size version of an image that is not an advertisement, the reduced-size version of the advertisement comprising a first advertisement in a sequence of advertisements, the sequence of advertisements selected via a probabilistic system applying a statistical model to match advertisement content with the plurality of images;
generating, by the computer system, in response to user input associated with the previously displayed reduced-size version of the advertisement displayed in connection with the slideshow, a full-screen view of the advertisement in the slideshow user interface, the full-screen view encompassing the entire display screen except for its edges, the edges comprising the edge comprising the thumbnail strip; and enabling, by the computer system, a user to interact with the full-screen view of the advertisement in the slideshow user interface.

2. The method of claim 1, wherein the user input associated with the previously displayed reduced-size version of the advertisement comprises indicating the reduced-size version of the advertisement by a user input type selected from a group of user input types consisting of: a mouse hover or a mouse click.

3. The method of claim 1, wherein the user input associated with the previously displayed reduced-size version of the advertisement comprises interaction with a contextual trigger.

4. The method of claim 3, wherein the contextual trigger comprises a contextual trigger type selected from a group of contextual trigger types consisting of: a visual region on-screen, a speech recognition, an attentional cue, or a detectable indicator of interest.

5. The method of claim 1, wherein the advertisement adapts its content in response to information about the user.

6. The method of claim 1, wherein the advertisement adapts its behavior in response to information about the user.

7. The method of claim 1, wherein the reduced-size version of the advertisement is selected for display according to a system selected from a group of system types consisting of: a rule-based system or the probabilistic system to improve the applicability of the advertisement to the content being viewed.

8. The method of claim 7, wherein the rule-based system accepts as input a set of parameters and applies a decision tree to select the reduced-size version of the advertisement to display.

9. The method of claim 7, wherein the rule-based system uses keyword matching.

10. The method of claim 1, wherein the probabilistic system takes into account at least one of: the context of content being displayed, browsing and ad-interaction history of the user, or presentation histories of the advertisement.

11. A method comprising:
identifying, by a computer system, a plurality of images within a web page displayed on a display screen of the computer system, the identifying being performed in response to receiving the web page at the computer system;
prefetching, by the computer system, the plurality of images from a remote server;
generating, by the computer system, a slideshow user interface that includes one image in the plurality of images in a larger size and a set of images in the plurality of images in a smaller size, wherein responsive to receiving, from a user, user input associated with an image of the set of images in the smaller size, causing the image to be displayed in the larger size, the set of images in the smaller size displayed along an edge of a window in a thumbnail strip, and wherein a first portion of the thumbnail strip displays an advertisement and a second portion of the thumbnail strip displays zero advertisements, and wherein the one image in the larger size and the set of images in the smaller size are displayed simultaneously, the advertisement comprising a first advertisement in a sequence of advertisements, the sequence of advertisements selected via a probabilistic system applying a statistical model to match advertisement content with the plurality of images; and
responsive to receiving a user input associated with the advertisement being displayed in the thumbnail strip, generating, by the computer system, the advertisement in the larger size in the slideshow user interface.

12. The method of claim 11, wherein the thumbnail strip is displayed along the bottom edge of the window.

13. The method of claim 11, wherein the thumbnail strip is displayed along a side edge of the window.

14. The method of claim 11, wherein the right-most portion of the thumbnail strip is reserved to display the advertisement.

15. The method of claim 11, wherein the user input associated with the previously displayed reduced-size version of the advertisement comprises a click or a cursor hover.

16. The method of claim 11, wherein the thumbnail strip is retractable.

17. The method of claim 11, further comprising:
enabling a user to interact with the advertisement in the larger size in the slideshow user interface.

18. The method of claim 11, further comprising:
responsive to user interaction with the advertisement in the larger size in the slideshow user interface, generating an advertisement landing page such that context of the slideshow user interface is preserved.

19. A non-transitory computer-readable storage medium that when executed by a processor in communication with a display, performs a method comprising:
identifying, by the processor, a plurality of images within a web page displayed on a display screen of the computer system, the identifying being performed in response to receiving the web page at the computer system;
prefetching, by the processor, the plurality of images from a remote server;
generating, by the processor, a slideshow user interface that includes one image in the plurality of images in a larger size and a set of images in the plurality of images in a smaller size, wherein responsive to receiving, from a user, user input associated with an image of the set of images in the smaller size, causing the image to be displayed in the larger size, the set of images in the smaller size displayed along an edge of a window in a thumbnail strip, and wherein a first portion of the thumbnail strip displays a reduced-size version of an advertisement and a second portion of the thumbnail strip displays a reduced-size version of an image that is not an advertisement, the reduced-size version of the advertisement comprising a first advertisement in a sequence of advertisements, the sequence of advertisements selected via a probabilistic system applying a statistical model to match advertisement content with the plurality of images;
generating, by the processor, in response to user input associated with the previously displayed reduced-size version of the advertisement displayed in connection with the slideshow, a full-screen view of the advertisement in the slideshow user interface, the full-screen view encompassing the entire display screen except for its edges, the edges comprising the edge comprising the thumbnail strip; and
enabling a user to interact with the full-screen view of the advertisement in the slideshow user interface.

20. A computing device comprising:
- a processor;
- a display;
- a storage medium for tangibly storing thereon program logic for execution by the processor, the program logic comprising:
  - identification logic executed by the processor for identifying a plurality of images within a web page displayed on a display screen of the computer system, the identifying being performed in response to receiving the web page at the computer system;
  - prefetch logic executed by the processor for prefetching the plurality of images from a remote server;
  - user interface generating logic executed by the processor for generating a slideshow user interface that includes one image in the plurality of images in a larger size and a set of images in the plurality of images in a smaller size, wherein responsive to receiving, from a user, user input associated with an image of the set of images in the smaller size, causing the image to be displayed in the larger size, the set of images in the smaller size displayed along an edge of a window in a thumbnail strip, and wherein a first portion of the thumbnail strip displays a reduced-size version of an advertisement and a second portion of the thumbnail strip displays a reduced-size version of an image that is not an advertisement, the reduced-size version of the advertisement comprising a first advertisement in a sequence of advertisements, the sequence of advertisements selected via a probabilistic system applying a statistical model to match advertisement content with the plurality of images;
  - full-screen view generating logic executed by the processor for generating, in response to user input associated with the previously displayed reduced-size version of the advertisement displayed in connection with the slideshow, a full-screen view of the advertisement in the slideshow user interface, the full-screen view encompassing the entire display screen except for its edges, the edges comprising the edge comprising the thumbnail strip; and
  - generating logic executed by the processor for enabling a user to interact with the full-screen view of the advertisement in the slideshow user interface.

* * * * *